United States Patent
Reith

(10) Patent No.: US 10,356,693 B2
(45) Date of Patent: Jul. 16, 2019

(54) NETWORK RESOURCES BROKERING SYSTEM AND BROKERING ENTITY

(71) Applicant: Deutsche Telekom AG, Bonn (DE)

(72) Inventor: Lothar Reith, Frankfurt am Main (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/879,992

(22) Filed: Jan. 25, 2018

(65) Prior Publication Data
US 2018/0220358 A1    Aug. 2, 2018

(30) Foreign Application Priority Data
Feb. 1, 2017    (EP) .................................... 17154226

(51) Int. Cl.
*H04W 48/02*    (2009.01)
*H04W 4/24*    (2018.01)
*H04W 84/04*    (2009.01)
*G06Q 10/06*    (2012.01)
*G06Q 30/08*    (2012.01)
*H04W 16/00*    (2009.01)
*H04M 15/00*    (2006.01)

(52) U.S. Cl.
CPC ........ *H04W 48/02* (2013.01); *G06Q 10/0631* (2013.01); *G06Q 30/08* (2013.01); *H04W 4/24* (2013.01); *H04W 16/00* (2013.01); *H04M 15/80* (2013.01); *H04W 84/042* (2013.01)

(58) Field of Classification Search
CPC ...... H04W 48/02; H04W 4/28; H04W 84/042
See application file for complete search history.

(56) References Cited

U.S. PATENT DOCUMENTS

| | | | |
|---|---|---|---|
| 2013/0084878 A1* | 4/2013 | Chen ...................... | H04W 72/10 455/452.1 |
| 2013/0107783 A1* | 5/2013 | Shaw ...................... | H04W 4/06 370/312 |
| 2013/0132854 A1* | 5/2013 | Raleigh ................. | G06F 3/0482 715/738 |

(Continued)

FOREIGN PATENT DOCUMENTS

EP    1371220 B1    1/2007

OTHER PUBLICATIONS

Extended European Search Report from EP Application No. EP 17154226.9, dated Mar. 30, 2017.

(Continued)

*Primary Examiner* — Asghar H Bilgrami
(74) *Attorney, Agent, or Firm* — Workman Nydegger

(57) ABSTRACT

The disclosure relates to a network resources brokering system, comprising: a communication network comprising at least one network resource; and a brokering entity, configured to receive requests from a plurality of network entities for accessing the at least one network resource within a charging period, each request comprising an electronic bid value competing with other network entities for accessing the at least one network resource, wherein the brokering entity is configured to select a network entity from the plurality of network entities, the selected network entity being associated with a bid value fulfilling a selection rule, and to grant the selected network entity access to the at least one network resource within the charging period.

17 Claims, 5 Drawing Sheets

(56) References Cited

U.S. PATENT DOCUMENTS

| | | | |
|---|---|---|---|
| 2013/0303114 A1* | 11/2013 | Ahmad | H04W 16/14 |
| | | | 455/406 |
| 2014/0074641 A1* | 3/2014 | Wang | G06F 9/50 |
| | | | 705/26.3 |
| 2015/0067171 A1 | 3/2015 | Yum et al. | |
| 2016/0027112 A1* | 1/2016 | Smith | G06Q 40/04 |
| | | | 705/37 |

OTHER PUBLICATIONS

Zhu et al., "Virtualization of 5G Cellular Networks as a Hierarchical Combinatorial Auction," IEEE Transactions on Mobile Computing, vol. 15, No. 10, Oct. 2016, pp. 2640-2654.
European Office Communication from EP Application No. EP 17 154 226.9, dated Apr. 26, 2018.
Lambert, "A Model for Common Operational Statistics," Pittsburgh Supercomputing Center, Operational Statistics RFC 1857, Oct. 1995, 28 Pages.

* cited by examiner

NETWORK RESOURCES BROKERING SYSTEM AND BROKERING ENTITY

TECHNICAL FIELD

The present disclosure relates to a network resources brokering system and a brokering entity for providing access to at least one network resource of a communication network within a charging period. In particular, the disclosure relates to a system and method for granting preferential treatment during a charging period to a successful bidder of a bidding process.

BACKGROUND

Charging, accounting and billing are crucial features of communication systems and services. The network provider must design tariffs for the whole range of services offered. This is partly a marketing decision, tariffs should be attractive to customers, but network providers are also concerned with technical efficiency and cost-recovery. Charging schemes should encourage the customers for efficient use of the network resources and should generate revenue in a fair way according to the relative usage by the customers. The development of multiservice and multilayer next generation mobile networks (NGMN) poses new challenges to the design of charging schemes. In multiservice networks, tariffs can depend on a number of parameters which define the traffic and quality of service (QoS) characteristics of a connection. Charges should reflect network resource usage. The way a customer uses the network depends on the tariffs and how the customer values each type of connection. Charging periods have been used in the field of telecommunications networks to provide differentiated pricing per charging period, such as so called time of day accounting. With the advent of next generation networks such as 5G, for example, new network functions, layers, infrastructures and services can be realized. The current charging schemes are no longer suitable to guarantee a fair charging of used network resources and to avoid inefficient usage of network resources.

SUMMARY

It is the object of the invention to provide an intelligent charging concept in order to achieve efficient utilization of network resources, in particular in a next generation mobile network where network resources are dynamically provided.

This object is achieved by the features of the independent claims. Further implementation forms are apparent from the dependent claims, the description and the figures.

A basic idea of the invention is to apply a capacity brokering architecture, where network resources are provided dynamically depending upon bids offered. The price for the consumption of chargeable consumption units can be determined in a bidding process. This new charging concept provides efficient utilization of network resources, in particular in 5G mobile networks.

The invention provides a system, a method as well as a business model. The invention is based on the idea to introduce dynamic pricing to the process of price definition for chargeable consumption units that get consumed during a charging period. It allows determining the price of a chargeable consumption unit consumed during a charging period in a bidding process that occurs prior to the start of the charging period. In a preferred embodiment the length of a charging period shall be aligned with the length of the aggregation period for operational statistics as defined in IETF RFC 1857. In many telecommunications networks today, an aggregation period of 15 minutes is used—therefore a preferred embodiment assumes a uniform charging period length of 15 minutes which is synchronized to start and stop at the same time as the aggregation period for operational statistics. This synchronization allows creating a feedback loop which utilizes the operational statistics and other statistics gathered also in 15 minute intervals, such as user experience statistics, drive tests in mobile networks doing automatic test calls and measuring the call quality, applications in mobile handsets doing regular ping tests to measure the availability of low latency access etc. Of course other charging period durations such as 5 minute intervals or even shorter are possible, if the statistic data used for the feedback loop are also aggregated and gathered for the same shortened aggregation period which is aligned with the shortened charging period.

The concept of the invention is to introduce a bidding process where a multiplicity of bidders with a minimum of one bidder place bids for a set of charging periods, for example in one bidding event they may place 96 bids for the 96 charging periods of one day (for example for the next day or for the day after the next day). In another preferred embodiment, they place in one bidding event 672 bids (7 for charging period of each day of the coming week). Bidding will be done in an automated way based on policies set by the charged party which benefits from being elected as successful bidder. The business model is based on the business agreement between the charged party as bidder and the charging party as network resource owner or agent of the network resource owner that the charged party will be obliged to pay the amount it has bid for each chargeable consumption unit that the charged party's users consume during said charging period where it is elected as successful bidder. In a preferred embodiment, the charged party is a 5G network slice owner, and the charged party's users are mobile subscribers that are permanently assigned to said 5G network slice, or alternatively mobile subscribers that get assigned to said 5G network slice based upon signaling an APN, or in another preferred embodiment based upon an application layer event that occurs during an access session (PDP context) that leads to certain IP flows getting offloaded or redirected to another 5G slice, for example to satisfy ultra low latency requirements.

In order to describe the invention in detail, the following terms, abbreviations and notations will be used:
5G: fifth generation mobile network
LTE Long Term Evolution
PDP Packet Data Protocol
APN Access Point Name Systems, devices and methods according to the disclosure describe new charging concepts for communication networks, in particular multiservice and multilayer communication networks such as 5G mobile networks. Multiservice communication networks include facilities for charging, accounting and billing. In this context, charging designates the calculation of a charge for a connection, e.g. based on a charging period. This may be calculated based on some characteristics of the connection, according to a charging scheme, which in turn is part of a tariffing policy. Accounting involves gathering the information necessary so that total charges can be itemized against tariffs and usage measurements. Billing involves collecting charge information over a given billing period and communicating this to the customer in the form of a bill.

According to a first aspect, the invention relates to a network resources brokering system, comprising: a communication network comprising at least one network resource; and a brokering entity, configured to receive requests from a plurality of network entities for accessing the at least one network resource within a charging period, each request comprising an electronic bid value competing with other network entities for accessing the at least one network resource, wherein the brokering entity is configured to select a network entity from the plurality of network entities, the selected network entity being associated with a bid value fulfilling a selection rule, and to grant the selected network entity access to the at least one network resource within the charging period.

Such a network resources brokering system provides an intelligent charging which achieves efficient utilization of network resources, in particular in a next generation mobile network where network resources are dynamically provided. Due to the selection rule, competition of network entities for network resources can be introduced, resulting in an efficient use of the network resources, thereby optimizing data throughput as well as processor and memory utilization.

In an implementation form of the network resources brokering system, the brokering entity is configured to select the network entity prior to a start of the charging period.

This provides the advantage that the selected network entity can use the network resource when the charging period starts, thereby providing efficient utilization of the network resources.

In an implementation form of the network resources brokering system, the at least one network resource is a radio access network (RAN) resource and the brokering entity is configured to grant access to the RAN resource.

This provides the advantage that RAN resources can be saved when these resources are efficiently used.

In an implementation form of the network resources brokering system, the brokering entity is configured to rank the plurality of network entities according to their electronic bid values and to select a network entity which request comprises a highest electronic bid value.

This provides the advantage that a fair selection can be implemented. A network entity that urgently requires a network resource can offer a high electronic bid value in order to be selected by the brokering entity.

In an implementation form of the network resources brokering system, the brokering entity is configured to select network entities of the plurality of network entities, which requests comprise the same electronic bid value, according to a fair arbitration scheme.

This provides the advantage of fair selection, e.g. by partitioning the network resource in a time, frequency or space multiplexed manner.

In an implementation form of the network resources brokering system, the fair arbitration scheme is based on a round robin scheduling.

This provides the advantage that each of the network entities having offered the same electronic bid value can access the network resource after some predetermined time period.

In an implementation form of the network resources brokering system, the selection rule further depends on a distance of a respective network entity of the plurality of network entities to the at least one network resource.

This provides the advantage that by using a high electronic bid value, the network entity can connect to a network resource within a close geographical distance, i.e. efforts for transferring data to the network resource, e.g. with respect to latency, power, etc. can be reduced.

In an implementation form of the network resources brokering system, the charging period is predetermined having a predetermined start time and a predetermined duration.

This provides the advantage that the network entities know at what time and how long they can access the network resource. Thus they can acquire other network resources if the charging period is not big enough.

In an implementation form of the network resources brokering system, the communication network is a network according to a fifth generation (5G) or according to a further generation, and wherein the at least one network resource is a network resource of a network slice of the communication network.

Then, a multilayered communication structure which may be connected via different access technologies to various 5G communication terminals providing the advantages as described below with respect to FIGS. 4 and 5 can be used.

In an implementation form of the network resources brokering system, the at least one network resource is a chargeable resource and the brokering entity is configured to grant the selected network entity consumption of the at least one network resource within the charging period.

This provides the advantage that the network resources are chargeable which means that they may be partitioned into small units, e.g. by a time-multiplex, frequency-multiplex or space-multiplex, for consumption by the network entities.

In an implementation form of the network resources brokering system, the brokering entity is configured to grant the selected network entity preferential scheduling for accessing the at least one network resource.

This provides the advantage that the selected network entity can be preferred when accessing the network resources, e.g. by being the first on a list or by having the highest priority or other strategies.

In an implementation form of the network resources brokering system, the preferential scheduling is a preferential scheduling with respect to time and/or space.

This provides the advantage that the selected network entity is first served when there is available capacity on the network resource or that the selected network entity gets access to a network resource in a close environment of the selected network entity in order to save power and reduce latency for connecting to the network resource.

In an implementation form of the network resources brokering system, a length of the charging period is aligned with a length of an aggregation period for providing operational statistics of the communication network.

This provides the advantage that statistics of the communication network, e.g. key performance indicators or a quality measure can be exploited to guarantee an optimal charging period.

In an implementation form of the network resources brokering system, the selection rule is based on a quality of the communication network that is determined by the brokering entity based on feedback of the operational statistics of the communication network.

This provides the advantage that a fair selection can be achieved considering the quality of the communication network.

According to a second aspect, the invention relates to a brokering entity for providing access to at least one network resource of a communication network, the brokering entity comprising: a receiver, configured to receive requests from a plurality of network entities for accessing the at least one network resource within a charging period, each request comprising an electronic bid value competing with other network entities for accessing the at least one network resource; and a controller, configured to select a network entity from the plurality of network entities, the selected network entity being associated with a bid value fulfilling a selection rule, and to grant the selected network entity access to the at least one network resource within the charging period.

Such a brokering entity provides an intelligent charging which achieves efficient utilization of network resources, in particular in a next generation mobile network where network resources are dynamically provided. Due to the selection rule, competition of network entities for network resources can be introduced, resulting in an efficient use of the network resources, thereby optimizing data throughput as well as processor and memory utilization.

In an implementation form of the brokering entity, the communication network is a network according to a fifth generation (5G) or according to a further generation, and wherein the controller is configured to grant the selected network entity access to at least one network resource of a network slice of the communication network.

Then, a multilayered communication structure which may be connected via different access technologies to various 5G communication terminals providing the advantages as described below with respect to FIGS. 4 and 5 can be used.

According to a third aspect, the invention relates to a system for resource consumption scheduling in a telecommunications network based on bids offered, characterized by said resource consumption scheduling system being operated by a charging party granting preferential treatment during a charging period to a charged party that has been determined as successful bidder in a bidding process that occurred prior to the start of said charging period.

In an implementation form of the system, said resource consumption scheduling is the scheduling of the consumption of chargeable resource consumption units.

In an implementation form of the system, said preferential treatment is the preferential scheduling of said consumption of said chargeable resource consumption units.

In an implementation form of the system, said preferential scheduling of said consumption of said chargeable resource consumption units is the preferential scheduling in the time dimension, characterized by said successful bidder being serviced prior to an unsuccessful bidder in case both demand side parties compete for access to a chargeable consumption unit.

In an implementation form of the system, said preferential scheduling of said consumption of said chargeable resource consumption units is the preferential scheduling in the space dimension, and said successful bidder is serviced by a preferential placement of a network service function.

In an implementation form of the system, preferential placement of a network service function is the placement of a network service function in a cloudlet infrastructure that is located close to the user in order to minimize access latency.

In an implementation form of the system, said preferential scheduling of said consumption of said chargeable resource consumption units is the preferential scheduling in the space and time dimensions, and said successful bidder is serviced by preferential access to radio resources.

In an implementation form of the system, said preferential access to radio resources is achieved by assigning better QCI values during the charging period.

In an implementation form of the system, said telecommunications network is a public land mobile network.

In an implementation form of the system, said telecommunications network is a public land fixed network.

In an implementation form of the system, said telecommunications network is a 5G mobile network.

In an implementation form of the system, said charging party is the supply side party in said bidding process.

In an implementation form of the system, said charged party is a minimum of one demand side party that is part of a set of demand side parties that belong to a multiplicity with a minimum of one demand side parties which participate in said bidding process.

In an implementation form of the system, said charging period is the time between two charging period change events.

In an implementation form of the system, the first one of said charging period change events is the start of the first charging period.

In an implementation form of the system, each said charging period change event except said first one is marking the end of a charging period and the start of the next charging period.

In an implementation form of the system, said charging period is a predetermined charging period with a predetermined charging period start time and a predetermined charging period duration.

In an implementation form of the system, said predetermined charging period duration is 15 minutes.

In an implementation form of the system, said predetermined charging period duration is 10 minutes.

In an implementation form of the system, said predetermined charging period duration is 5 minutes.

In an implementation form of the system, said predetermined charging period duration is 1 minute.

In an implementation form of the system, said predetermined charging period duration is 1 second.

In an implementation form of the system, said successful bidder is determined in a bidding process that involves said charging party offering a multiplicity with a minimum of one charging periods with preferential treatment for the successful bidder.

In an implementation form of the system, said successful bidder is determined in said bidding process and said bidding process comprises a multiplicity of bidding rounds with a minimum of one bidding round.

In an implementation form of the system, the bidding process determines a single successful bidder.

In an implementation form of the system, the bidding process determines a multiplicity of successful bidders that are ranked according to their offered bids, where only the bidders with the lowest bid do not get a preferential treatment, and where all bidders that have offered the same bid for a charging period get treated equally according to a fair arbitration method, and where higher ranked successful bidders get preferential treatment over lower ranked successful bidders and over unsuccessful bidders who offered the lowest bid.

In an implementation form of the system, said fair arbitration method is round robin scheduling starting with a random successful bidder from the set of successful bidders having offered the same bid.

In an implementation form of the system, said fair arbitration method is round robin scheduling starting with the bidder who provided the first of the successful bids (time of bidding).

In an implementation form of the system, said fair arbitration method is a scheduling method that is based on selecting a random successful bidder from the set of successful bidders having offered the same bid.

In an implementation form of the system, each demand side party belonging to a multiplicity of demand side parties is determined as successful bidders for a resource consumption unit during a charging period based on the fact that each of said demand side party belonging to a multiplicity of demand side parties is determined as successful bidders having offered the same bid price in the final round of said bidding process for each said resource consumption unit consumed during said charging period.

In an implementation form of the system, a single demand side party is determined as successful bidder for a charging period based on the fact that said single demand side party has offered the highest bid for said resource consumption unit during said charging period.

The system according to the third aspect can also be implemented as a method or as a business model.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
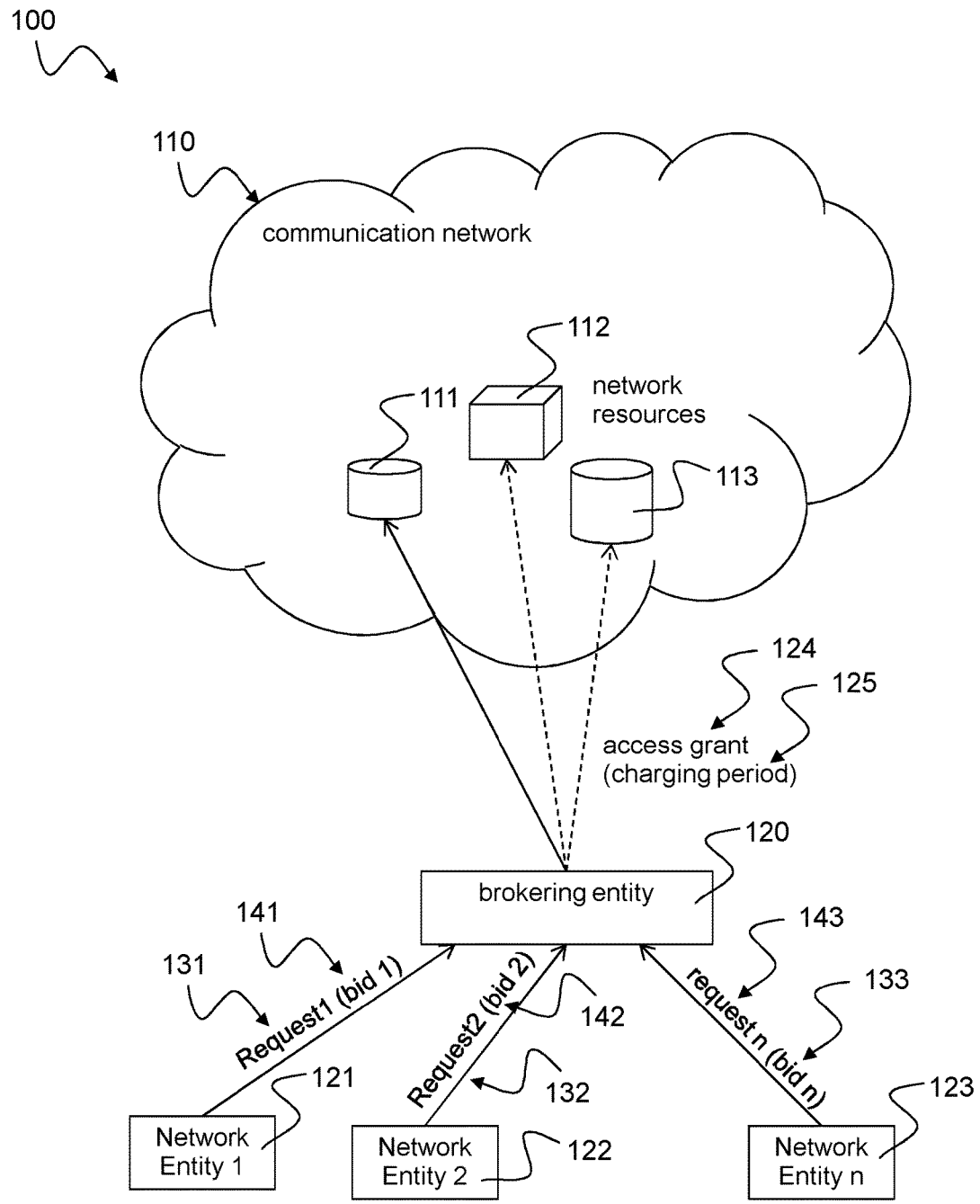
FIG. 1 shows a schematic diagram illustrating a network resources brokering system 100 according to the disclosure.

FIG. 1 shows a schematic diagram illustrating a network resources brokering system 100 according to the disclosure. The network resources brokering system 100 includes a communication network 110 including one or more network resources 111, 112, 113 and a brokering entity 120.

The brokering entity 120 receives requests 131, 132, 133 from a plurality of network entities 121, 122, 123 for accessing 124 the one or more network resources 111, 112, 113 within a charging period 125. Each request includes an electronic bid value 141, 142, 143 competing with other network entities 121, 122, 123 for accessing the at least one network resource 111, 112, 113. The brokering entity 120 selects a network entity from the plurality of network entities 121, 122, 123, e.g. the first network entity 121 as an example. The selected network entity 121 is associated with a bid value 141 fulfilling a selection rule. The brokering entity 120 grants the selected network entity 121 access 124 to the one or more network resources 111, 112, 113 within the charging period 125.

The brokering entity 120 may select the network entity 121 prior to a start of the charging period 125. The one or more network resources 111, 112, 113 may be radio access network (RAN) resources, for example and the brokering entity 120 may grant access 124 to the RAN resource.

In one implementation, the brokering entity 120 may rank the plurality of network entities 121, 122, 123 according to their electronic bid values 141, 142, 143 and may select a network entity 121 which request comprises a highest electronic bid value 141. For example, the brokering entity 120 may select network entities of the plurality of network entities 121, 122, 123, which requests 131, 132, 133 include the same electronic bid value 141, 142, 143 according to a fair arbitration scheme. The fair arbitration scheme may for example be based on a round robin scheduling.

The selection rule may further depend on a (geographical) distance of a respective network entity of the plurality of network entities 121, 122, 123 to the one or more network resources 111, 112, 113. A small distance may be of higher value than a great distance due to saving resources and power for initiating the connection over the mentioned local distance. The charging period 125 may be predetermined, e.g. having a predetermined start time and a predetermined duration or end time.

The communication network 110 may be a network according to a fifth generation (5G), e.g. a 5G network 400, 500 as described below with respect to FIGS. 4 and 5 or according to a further generation. The network resources 111, 112, 113 may be network resources of a network slice 510b, 511b, 512b of the communication network 400, 500, e.g. as described below with respect to FIGS. 4 and 5.

The one or more network resources 111, 112, 113 may be chargeable resources. The brokering entity 120 may grant the selected network entity 121 consumption of the one or more network resources 111, 112, 113 within the charging period 125.

In one implementation, the brokering entity 120 may grant the selected network entity 121 preferential scheduling for accessing the at least one network resource 111, 112, 113, e.g. preferential scheduling with respect to time and/or space. I.e. the selected network entity 121 may be first served (in time) or may get access to a network resource which is located within a minimum geographical distance from the selected network entity 121.

A length of the charging period 125 may be aligned with a length of an aggregation period for providing operational statistics of the communication network 110. The selection rule may be based, for example, on a quality of the communication network 110 that may be determined by the brokering entity 120 based on feedback of the operational statistics of the communication network 110. Thus, the selection rule may consider a quality of the network to provide a fair access to the network resources 111, 112, 113.

Figure 2:
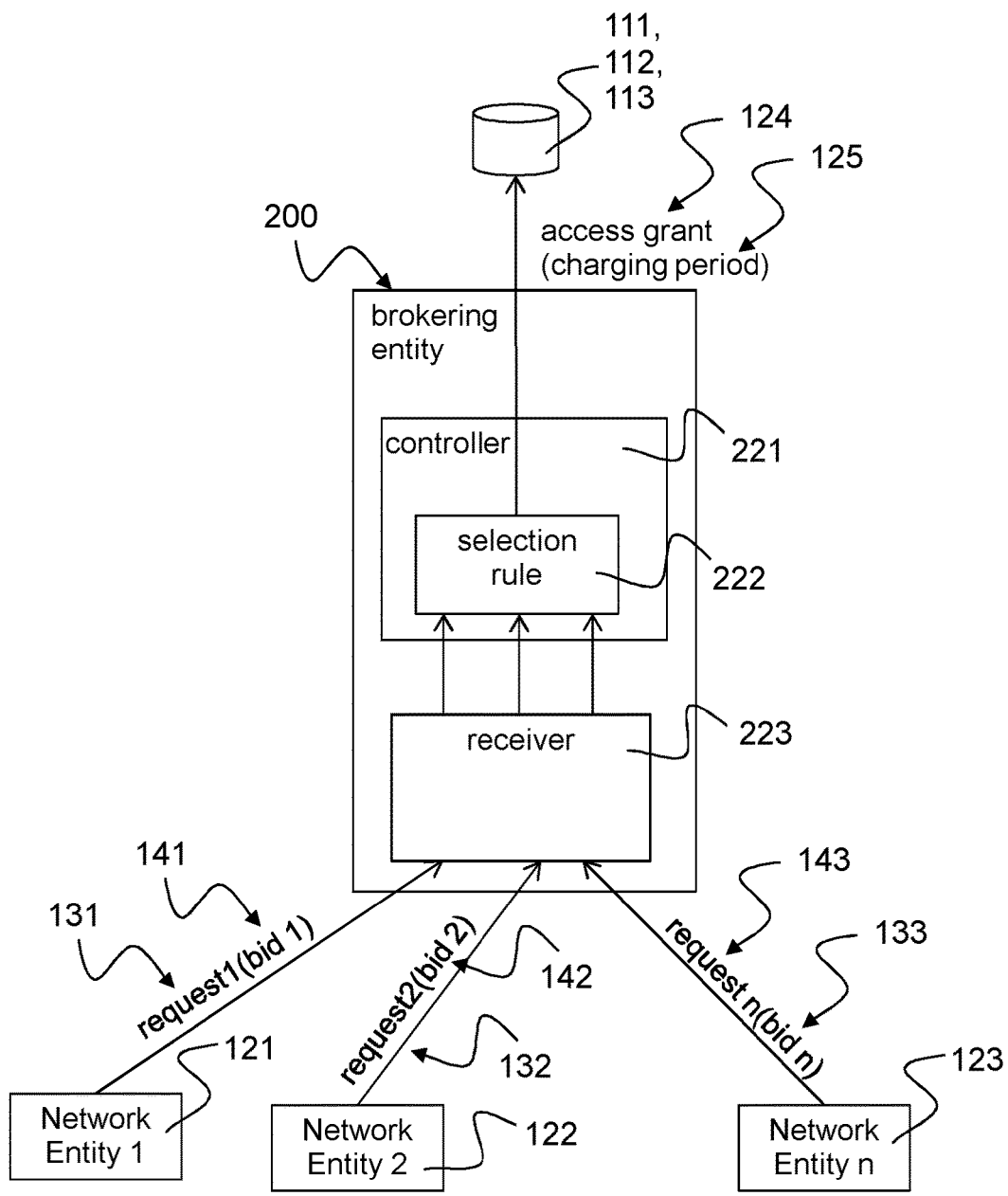
FIG. 2 shows a block diagram of a brokering entity 200 for providing access to at least one network resource of a communication network according to the disclosure.

FIG. 2 shows a block diagram of a brokering entity 200 for providing access to at least one network resource 111, 112, 113 of a communication network according to the disclosure. The brokering entity 200 is a specific implementation of the brokering entity 120 described above with respect to FIG. 1. The brokering entity 200 includes a receiver 223 and a controller 221.

The receiver 223 receives requests 131, 132, 133 from a plurality of network entities 121, 122, 123 for accessing 124 the at least one network resource 111, 112, 113 within a charging period 125. Each request 131, 132, 133 includes an electronic bid value 141, 142, 143 competing with other network entities 121, 122, 123 for accessing the at least one network resource 111, 112, 113. The controller 221 selects a network entity from the plurality of network entities 121, 122, 123, e.g. the first network entity 121 as an example. The selected network entity 121 is associated with a bid value 141 fulfilling a selection rule 222. The controller 221 grants the selected network entity 121 access 124 to the at least one network resource 111, 112, 113 within the charging period 125. The selection rule may be implemented within an algorithm running on the controller 221, for example as a lookup table or any other kind of mapping. The selection rule may implement a fair scheduling, e.g. by using a round robin scheme.

The communication network 110 may be a network according to a fifth generation (5G) or according to a further generation as described above with respect to FIG. 1. The network resources 111, 112, 113 may be network resources of a network slice 510b, 511b, 512b of the communication network 400, 500, e.g. as described below with respect to FIGS. 4 and 5.

Figure 3:
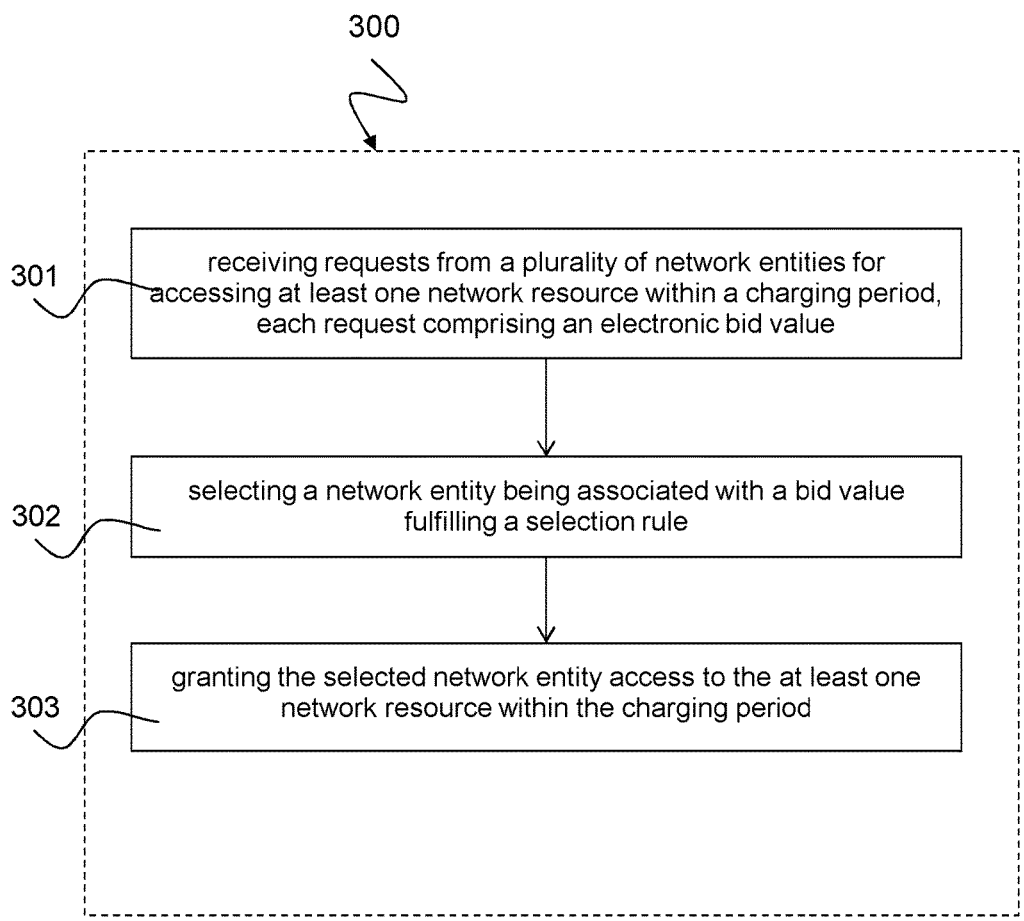
FIG. 3 shows a schematic diagram illustrating a method 300 for providing access to at least one network resource of a communication network according to the disclosure.

FIG. 3 shows a schematic diagram illustrating a method 300 for providing access to at least one network resource of a communication network according to the disclosure.

The method 300 includes receiving 301 requests from a plurality of network entities for accessing at least one network resource within a charging period, each request comprising an electronic bid value, e.g. as described above with respect to FIGS. 1 and 2. The method 300 further includes selecting 302 a network entity being associated with a bid value fulfilling a selection rule, e.g. as described above with respect to FIGS. 1 and 2. The method 300 further includes granting 303 the selected network entity access to the at least one network resource within the charging period, e.g. as described above with respect to FIGS. 1 and 2. The method 300 may be run on a brokering entity 120, 200 as described above with respect to FIGS. 1 and 2.

Figure 4:
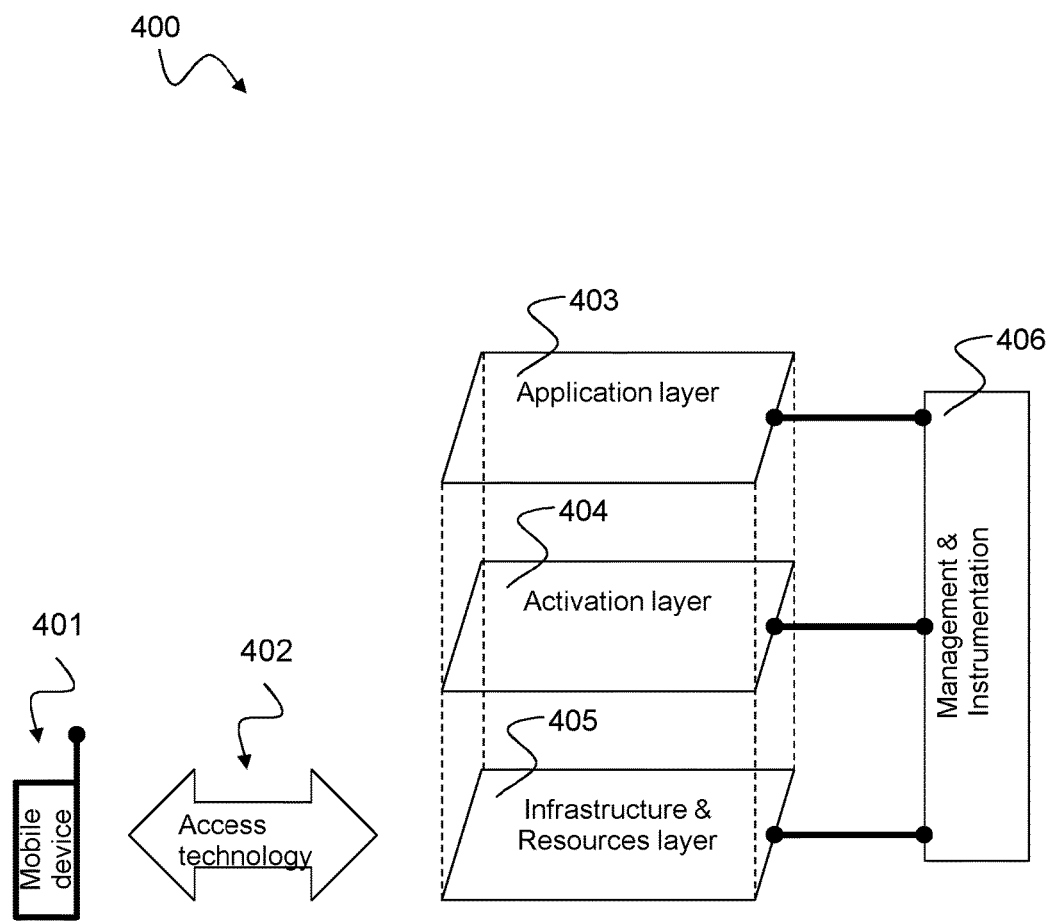
FIG. 4 shows a schematic diagram illustrating an exemplary 5G system architecture 400 which network resources can be accessed by a brokering entity according to the disclosure.

FIG. 4 shows a schematic diagram illustrating an exemplary 5G system architecture 400 which network resources can be accessed by a brokering entity according to the disclosure.

The 5G system architecture 400 includes an area with 5G communication terminals 401 which are connected via different access technologies 402 to a multilayered communication structure. This multilayered communication structure includes an Infrastructure & Resources layer 405, an activation layer 404 and an application layer 403 which are managed by a management & Instrumentation plane 406, The Infrastructure & Resources layer 405 includes the physical resources of a converged network structure of fixed and mobile network components ("Fixed-Mobile Convergence") with access point, cloud nodes (consisting of processing and storage node), 5G devices such as mobile phones, portable devices, CPEs, machine communication modules and other network nodes and related links, 5G devices can include multiple and configurable capabilities and act, for example, as a relay or hub or can operate depending on the particular context as a computer or memory resource. These resources are provided to the higher layers 404, 403 and the management & Instrumentation layer 406 via corresponding APIs (application program interfaces). Monitoring the performance and the configurations are inherent to such APIs.

The activation layer 404 includes a library of functions that are needed within a converged network in the form of blocks of a modular architecture. These include functions that are implemented in software modules that can be retrieved from a storage location of the desired location, and a set of configuration parameters for specific parts of the network, for example, the radio access. These features and capabilities can be accessed on demand by the management & Instrumentation layer 406 by using the provided APIs. Certain functions may exist in multiple variants, for example, different implementations of the same functionality having different performance or characteristic.

The application layer 403 includes specific applications and services of the network operator, the company, the vertical operator or by third parties who use the 5G network. The interface to the management & Instrumentation layer 406 allows to use certain dedicated network slices for an application, or to assign an application to an existing network slice.

The management & Instrumentation layer 406 is the contact point for the required use cases (use cases, business models) to put into actual network functions and slices. It defines the network slices for a given application scenario, concentrates the relevant modular network functions, assigns the relevant performance configurations and maps all to the resources of the infrastructure & resources layer 405. The management & Instrumentation layer 406 also manages the scaling of the capacity of these functions as well as their geographical distribution. In certain applications, the management & Instrumentation layer 406 may also have skills that allow third parties to produce and manage their own network slices by the use of APIs. Because of the numerous tasks of the management & Instrumentation layer 406, these are not a monolithic block of functionality but rather a collection of modular functions, integrating progresses that have been achieved in different network domains, such as NFV (network function virtualization), SDN (software-defined networking) or SON (self-organizing networks). The management & Instrumentation Layer 106 utilizes data assisted intelligence to optimize all aspects of service assembly and deployment.

By using the brokering entity 120, 200 described above with respect to FIGS. 1 and 2, network resources of the communication network 400 can be accessed. The brokering entity 120, 200 may be a part of the network 400 or may be arranged outside the network 400, for example in a foreign network. The brokering entity 120, 200 may for example located in the management & instrumentation level 406. Alternatively, each network slice or slice instance may include a brokering entity 120, 200. Network entities requesting resources of the communication network 400 may for example be network nodes of the infrastructure and resources layer 405, or network nodes of the activation layer 404 or network slices or slice instances of the application layer 403. Network entities requesting resources of the communication network 400 may also be mobile devices 401, base stations, base station controllers, radio network controllers etc. requesting resources for initiating a communication channel over the communication network 400.

The 5G network 400 increases the efficiency of communication and provides in particular a higher data throughput, lower latency, particularly high reliability, a much higher connection density and a larger mobility area. The 5G network 400 increases the operational flexibility and provides tailored features and functions while saving network resources. This increased performance is accompanied by the ability to control highly heterogeneous environments and the ability to secure trust, identity and privacy of users.

The presented devices, systems and methods are provided for the purpose to improve the efficiency of communication and charging in communication networks, in particular in 5G communications networks with multiple network slices, as described below.

Figure 5:
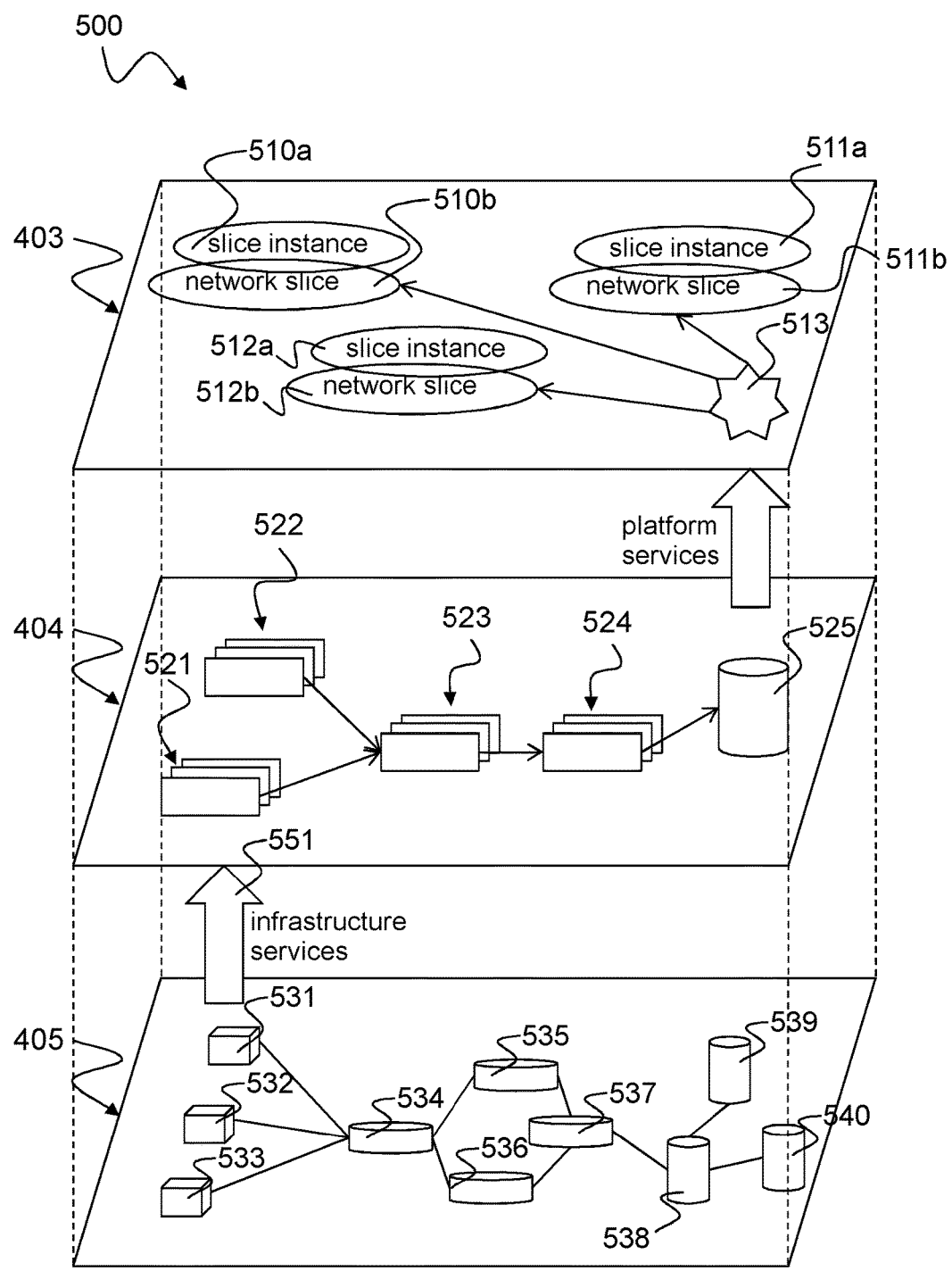
FIG. 5 shows a schematic diagram illustrating an exemplary 5G communication network 500 including a plurality of network slices which network resources can be accessed by a brokering entity according to the disclosure.

FIG. 5 shows a schematic diagram illustrating an exemplary 5G communication network 500 including a plurality of network slices which network resources can be accessed by a brokering entity according to the disclosure.

The 5G-communication network 500 includes an infrastructure & resources layer 405, an activation layer 404 and an application layer 403, as described above with respect to FIG. 4.

The Infrastructure & Resources layer 405 includes all physical assets that are associated with a network operator, i.e., locations, cable, network nodes, etc. This layer 405 forms the basis for all network slices. It is structured as generic as possible without too many specialized engineering units. The Infrastructure & Resources layer 405 conceals any kind of user-specific implementation towards the upper layers, so that the remaining systems can be used optimally for different slices. Components of the infrastructure and resources layer 405 are based on hardware and software or firmware that is needed for each operation and that is provided to the overlying layers as resource objects. Objects of infrastructure & resources layer 405, for example, include virtual machines, virtual links or connections and virtual networks, for example, virtual access node 531, 532, 533, virtual network nodes 534, 535, 536, 537 and virtual computer nodes 538, 539, 540. As the term "virtual" implies, the infrastructure and resources layer 405 provides the objects in the form of an "infrastructure as a service " 551, i.e. in an abstracted, virtualized form to the next higher layer 404.

The activation layer 404 is arranged above the infrastructure & resources layer 405. It uses the objects of the infrastructure & resources layer 405 and adds additional functionality to these objects, for example in the form of (non-physical) software objects/VNFs (virtual network functions) to enable generation of any type of network slices and hence to provide a platform as a service to the next higher layer 403.

Software objects can exist in any granularity, and may include a tiny or a very large fragment of a network slice. In order to be able to allow the generation of network slices on a suitable level of abstraction in the activation layer 404 different abstract objects 521 can be combined with other abstracted objects and virtual network functions 522 to form combined objects 523, which can be converted into aggregated objects 524 which can be provided in an object library 525 to the next higher level. Thus, the complexity can be hidden behind the network slices, For example, a user can create a mobile broadband slice and define merely a KPI (Key Performance Indicator)) without having to specify specific features such as individual local antenna cover, backhaul links and specific parameterization degrees. Supporting an open environment, allowing to add or delete network functions on demand, is an important skill of the activation layer 404 that supports the dynamic rearrangement of functions and connectivities in a network slice, for example, by using SFC (Service Function Chaining) or modifying software so that the functionality of a slice can be completely pre-defined and can include both approximately static software modules and dynamically addable software modules.

A network Slice can be regarded as software-defined entity that is based on a set of objects that define a complete network. The activation layer 404 plays in the success of this concept a key role since it can include all software objects that are necessary to provide the network slices and the appropriate skills to handle the objects. The activation layer 404 may be considered as a type of network operating system complemented by a network production environment. An important task of the activation layer 404 is defining the appropriate levels of abstraction. So network operators have sufficient freedom to design their network slices while the platform operator can still keep maintaining and optimizing the physical nodes. For example, the execution of everyday tasks such as adding or replacing NodeBs, etc. is supported without the intervention of the network client. The definition of suitable objects that model a complete telecommunications network, is one of the essential tasks of the activation layer 104 in developing the network slices environment.

A network slice, also known as 5G Slice, supports communication services of a certain type of connection with a particular type of handling of the C (Control) and U (User Data) layer. A 5G slice is composed of a collection of different 5G network functions and specific radio access technology (RAT) settings that are combined together for the benefit of the specific use case. Therefore, a 5G Slice spans all domains of the network, for example, software modules that run on a cloud node, specific configurations of the transport network that support a flexible location of functions, a particular radio configuration or even a particular access technology as well as a configuration of 5G devices. Not all slices contain the same features, some features that today seem to be essential for a mobile network can even not occur in some slices. The intention of the 5G Slice is to provide only the functions that are necessary for the specific use case and to avoid any other unnecessary functionalities. The flexibility behind the slice concept is the key to both the widening of existing applications as well as for creating new applications. Third party devices can thus be granted permission to control certain aspects of slicing through appropriate APIs to provide such customized services.

The application layer 403 includes all generated network Slices 510b, 511b, 512b and offers these as "network as a service" to different network users, for example, different customers. The concept allows the reuse of defined network slices 510b, 511b, 512b for different users, for example as a new network instance 510a, 511a, 512a. A network slice 510b, 511b, 512b which is associated, for example, with an automotive application can also be used for applications in various other industrial applications. The slices instances 510a, 511a, 512a, generated by a first user, can for example be independent of the slices instances that were generated by a second user, although the entire network slice functionality may be the same.

By using the brokering entity 120, 200 described above with respect to FIGS. 1 and 2, network resources of the communication network 400 can be accessed. The brokering entity 120, 200 may be a part of the network 500 or may be arranged outside the network 500, for example in a foreign network. The brokering entity 120, 200 may for example be located in a network slice 510b or slice instance 510a. Network entities requesting resources of the communication network 500 may for example be network nodes of the infrastructure and resources layer 405, or network nodes of the activation layer 404 or network slices or slice instances of the application layer 403. Network entities requesting resources of the communication network 500 may also be mobile devices, base stations, base station controllers, radio network controllers etc. requesting resources for initiating a communication channel over the communication network.

In a preferred embodiment, the network entity (i.e. the charged party) is a 5G network slice owner, and the charged party's users are mobile subscribers that are permanently assigned to said 5G network slice, or alternatively mobile subscribers that get assigned to said 5G network slice based upon signaling an APN (access point name, i.e. a gateway between a GSM, GPRS, 3G, 4G or 5G mobile network and another communication network, e.g. the Internet), or in another preferred embodiment based upon an application layer event that occurs during an access session (packet data protocol PDP context, i.e. a data structure present on both the serving support node and the gateway support node which contains the subscriber's session information when the subscriber has an active session) that leads to certain IP flows getting offloaded or redirected to another 5G slice, for example to satisfy ultra low latency requirements.

A preferred embodiment is based on 15 minute charging periods. A preferred embodiment is based on demand side parties using machine learning that builds a model based on a learning period with random bids or human expert provided bids, which evaluates the resulting user experience for an MVNO or 5G slice owner and applies the learned model for future automatic bidding once the model has learned enough in a initial training phase. Key for learning is the feedback loop enabled by operational measurement data or application ping data and other statistic data and network event data.

Another preferred embodiment is based on an innovative scheduling method which allows implementing the hierarchical preferential treatment of successful bidders using an innovative scheduling algorithm.

Another preferred embodiment is describing the details of an innovative 5G New Radio Scheduler, how to implement the procedures occurring at a charging period change in realtime in an efficient and scalable way.

Another preferred embodiment is based on realtime charging based on European Patent EP 1371 220 B1.

The methods, systems and devices described herein may be implemented as electrical and/or optical circuit within a chip or an integrated circuit or an application specific integrated circuit (ASIC). The invention can be implemented in digital and/or analogue electronic and optical circuitry.

The methods, systems and devices described herein may be implemented as software in a Digital Signal Processor (DSP), in a micro-controller or in any other side-processor or as hardware circuit within an application specific integrated circuit (ASIC) of a Digital Signal Processor (DSP).

The invention can be implemented in digital electronic circuitry, or in computer hardware, firmware, software, or in combinations thereof, e.g. in available hardware of conventional optical transceiver devices or in new hardware dedicated for processing the methods described herein.

The present disclosure also supports a computer program product including computer executable code or computer executable instructions that, when executed, causes at least one computer to execute the performing and computing steps described herein, in particular the method 300 as described above with respect to FIG. 3 and the techniques described above with respect to FIGS. 1 to 5. Such a computer program product may include a readable non-transitory storage medium storing program code thereon for use by a computer. The program code may perform the method 300 as described above with respect to FIG. 3.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A network resources brokering system, comprising:
a communication network comprising at least one network resource; and
a brokering entity, configured to receive requests from a plurality of network entities for accessing the at least one network resource within a charging period, each request comprising an electronic bid value competing with other network entities for accessing the at least one network resource,
wherein the brokering entity is configured to select a network entity from the plurality of network entities, the selected network entity being associated with a bid value fulfilling a selection rule, and to grant the selected network entity access to the at least one network resource within the charging period, wherein a length of the charging period is aligned with a length of an aggregation period for providing operational statistics of the communication network, wherein the charging period is synchronized to start and stop at the same time as the aggregation period for operational statistics, and wherein the brokering entity is configured to create a feedback loop by exploiting the synchronization between the charging period and the aggregation period, wherein the feedback loop utilizes the operational statistics and other statistics gathered periodically within the charging period to measure an availability of low latency access.

2. The network resources brokering system of claim 1, wherein the brokering entity is configured to select the network entity prior to a start of the charging period.

3. The network resources brokering system of claim 1, wherein the at least one network resource is a radio access network resource and the brokering entity is configured to grant access to the RAN resource.

4. The network resources brokering system of claim 1, wherein the brokering entity is configured to rank the plurality of network entities according to their electronic bid values and to select a network entity which request comprises a highest electronic bid value.

5. The network resources brokering system of claim 4, wherein the brokering entity is configured to select network entities of the plurality of network entities, which requests comprise the same electronic bid value, according to a fair arbitration scheme.

6. The network resources brokering system of claim 5, wherein the fair arbitration scheme is based on a round robin scheduling.

7. The network resources brokering system of claim 1, wherein the selection rule further depends on a distance of a respective network entity of the plurality of network entities to the at least one network resource.

8. The network resources brokering system of claim 1, wherein the charging period is predetermined having a predetermined start time and a predetermined duration.

9. The network resources brokering system of claim 1, wherein the communication network is a network according to a fifth generation, and wherein the at least one network resource is a network resource of a network slice of the communication network.

10. The network resources brokering system of claim 1, wherein the at least one network resource is a chargeable resource and the brokering entity is configured to grant the selected network entity consumption of the at least one network resource within the charging period.

11. The network resources brokering system of claim 1, wherein the brokering entity is configured to grant the selected network entity preferential scheduling for accessing the at least one network resource.

12. The network resources brokering system of claim 11, wherein the preferential scheduling is a preferential scheduling with respect to time and/or space.

13. The network resources brokering system of claim 1, wherein the selection rule is based on a quality of the communication network that is determined by the brokering entity based on feedback of the operational statistics of the communication network.

14. A brokering entity for providing access to at least one network resource of a communication network, the brokering entity comprising:

a receiver, configured to receive requests from a plurality of network entities for accessing the at least one network resource within a charging period, each request comprising an electronic bid value competing with other network entities for accessing the at least one network resource; and a controller, configured to select a network entity from the plurality of network entities, the selected network entity being associated with a bid value fulfilling a selection rule, and to grant the selected network entity access to the at least one network resource within the charging period, wherein a length of the charging period is aligned with a length of an aggregation period for providing operational statistics of the communication network, wherein the charging period is synchronized to start and stop at the same time as the aggregation period for operational statistics, and wherein the brokering entity is configured to create a feedback loop by exploiting the synchronization between the charging period and the aggregation period, wherein the feedback loop utilizes the operational statistics and other statistics gathered periodically within the charging period to measure an availability of low latency access.

15. The brokering entity of claim 14, wherein the communication network is a network according to a fifth generation, and wherein the controller is configured to grant the selected network entity access to at least one network resource of a network slice of the communication network.

16. A network resources brokering system, comprising:

a fifth generation (5G) communication network comprising at least one network resource of a network slice of the 5G communication network; and a brokering entity, configured to receive requests from a plurality of network entities for accessing the at least one network resource within a charging period, each request comprising an electronic bid value competing with other network entities for accessing the at least one network resource, wherein the brokering entity is configured to select a network entity from the plurality of network entities, the selected network entity being associated with a bid value fulfilling a selection rule, and to grant the selected network entity access to the at least one network resource within the charging period, wherein a length of the charging period is aligned with a length of an aggregation period for providing operational statistics of the communication network, wherein the charging period is synchronized to start and stop at the same time as the aggregation period for operational statistics, and wherein the brokering entity is configured to create a feedback loop by exploiting the synchronization between the charging period and the aggregation period, wherein the feedback loop utilizes the operational statistics and other statistics gathered periodically within the charging period to measure an availability of low latency access.

17. The network resources brokering system of claim 16, wherein the brokering entity is configured to grant the selected network entity preferential scheduling for accessing the network resource of the network slice with respect to space and time by enabling access to a network resource of the network slice which is located within a minimum geographical distance from the selected network entity and by first serving the selected network entity in time.

* * * * *